United States Patent [19]

Diaz

[11] 4,430,982
[45] Feb. 14, 1984

[54] CARBURETOR FOR AN INTERNAL COMBUSTION ENGINE

[75] Inventor: Luis A. R. Diaz, Santiago, Chile

[73] Assignee: Ramirez Development Corporation, New York, N.Y.

[21] Appl. No.: 265,642

[22] Filed: May 20, 1981

[51] Int. Cl.³ .......................................... F02M 25/06
[52] U.S. Cl. .................................... 123/568; 123/585
[58] Field of Search ................................ 123/585, 568

[56] References Cited

U.S. PATENT DOCUMENTS

| | | |
|---|---|---|
| 1,099,504 | 6/1914 | Kutscher . |
| 1,201,977 | 10/1916 | Lovejoy . |
| 1,236,267 | 8/1917 | Clark et al. . |
| 1,319,633 | 10/1919 | Waite . |
| 1,333,856 | 3/1920 | Loeffelholz . |
| 1,338,104 | 4/1920 | Shurtleff . |
| 1,382,285 | 6/1921 | Harris . |
| 1,432,751 | 10/1922 | Hallett . |
| 1,466,704 | 9/1923 | Dupont ............................. 123/585 |
| 1,676,563 | 7/1928 | LaPlant . |
| 2,419,298 | 4/1947 | Stille . |
| 2,633,837 | 4/1953 | Godfrey . |
| 3,786,793 | 1/1974 | Bohls et al. . |
| 3,800,764 | 4/1974 | Goto et al. . |
| 3,827,414 | 8/1974 | Sarto . |
| 3,872,845 | 3/1975 | Schultz . |
| 4,235,828 | 11/1980 | Howes . |

FOREIGN PATENT DOCUMENTS

| | | |
|---|---|---|
| 231838 | 10/1925 | United Kingdom . |
| 384994 | 12/1932 | United Kingdom . |
| 425773 | 3/1935 | United Kingdom . |
| 464312 | 4/1937 | United Kingdom . |
| 1532746 | 11/1978 | United Kingdom . |

*Primary Examiner*—Wendell E. Burns
*Attorney, Agent, or Firm*—Finnegan, Henderson, Farabow, Garrett & Dunner

[57] ABSTRACT

An improved flow-type carburetor for an internal combustion engine comprising an exhaust gas conduit and port for introducing exhaust gas into the area of the carburetor defined between the venturi and the throttle valve and two or more ports for introducing additional air into the area of the carburetor between the venturi and throttle valve.

17 Claims, 5 Drawing Figures

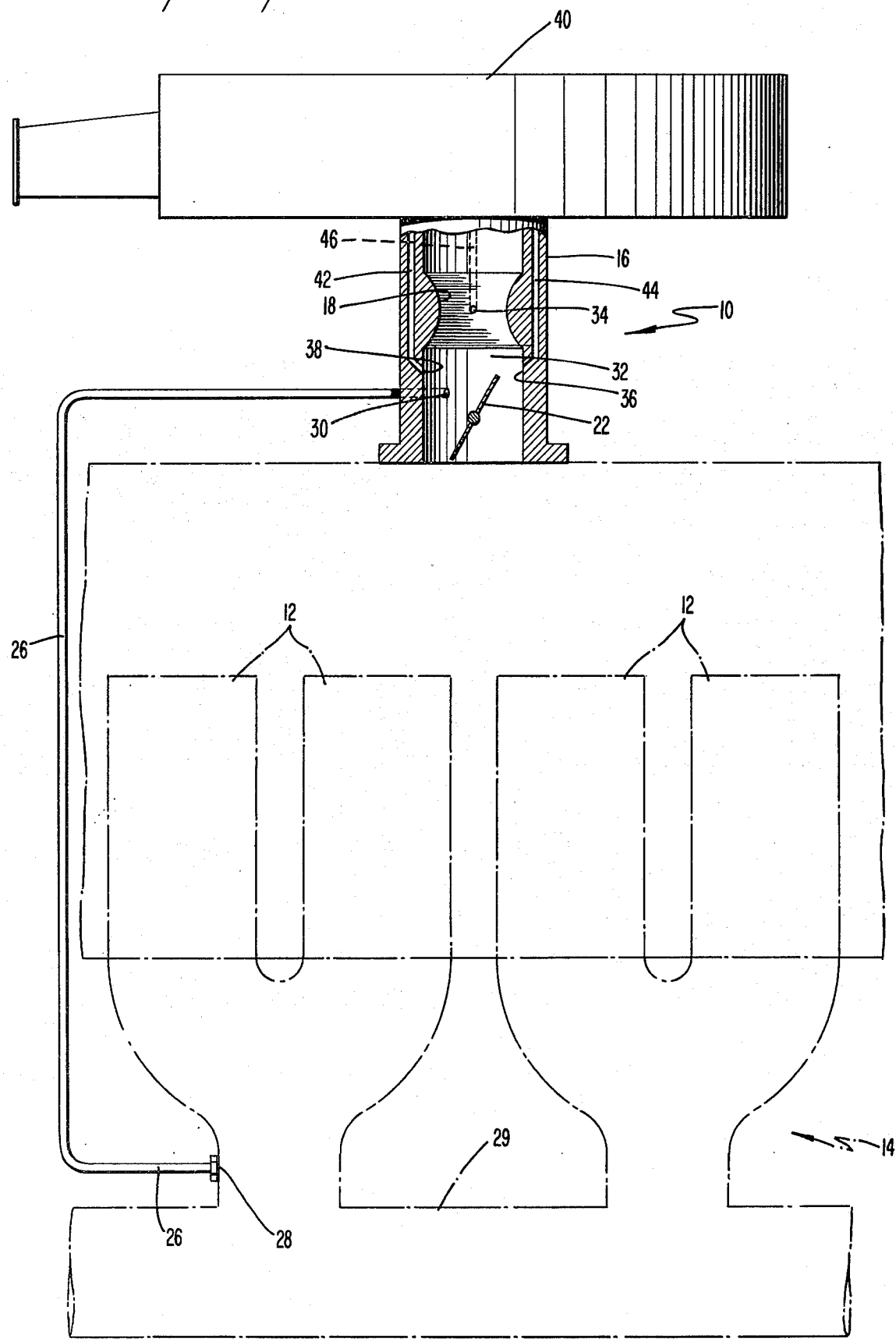

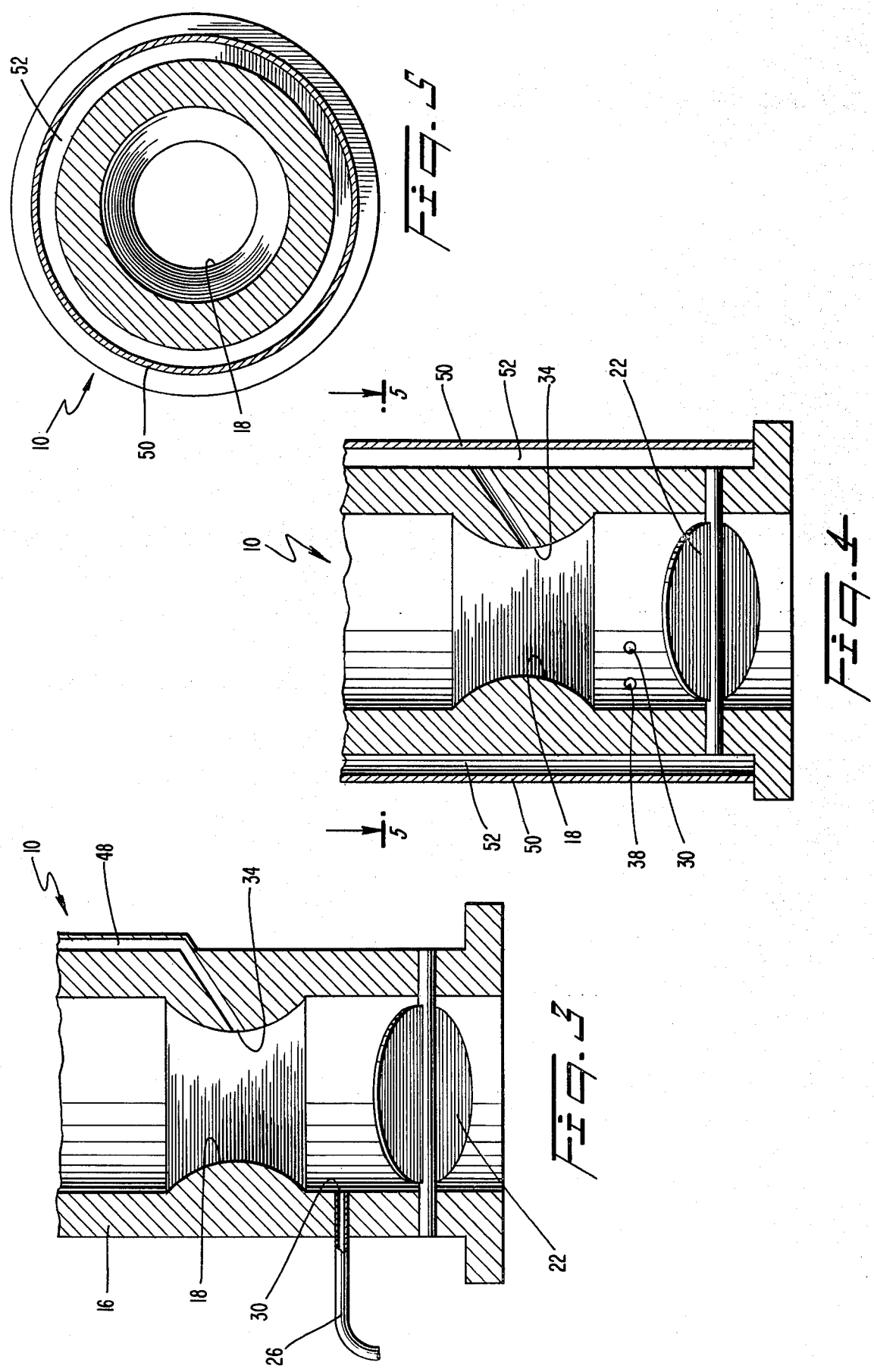

CARBURETOR FOR AN INTERNAL COMBUSTION ENGINE

BACKGROUND OF THE INVENTION

1. Field of the Invention

This invention relates to carburetors for internal combustion engines. More particularly, the invention relates to improvements to flow-type carburetors.

2. Description of the Prior Art

A flow-type carburetor automatically atomizes, vaporizes and mixes gasoline and air in the proper proportions necessary for the various power demands of an internal combustion engine. The suction stroke of pistons draws air into the carburetor and through a venturi. The lower pressure created by the venturi draws fuel from a fuel jet or nozzle atomizing, vaporizing and mixing the fuel with the air. The air-fuel mixture then passes through a throttle valve to the engine cylinders.

The amount of fuel mixed with air depends upon the drop of pressure created in the venturi and the volume and velocity of air passing through the carburetor. The openings of the throttle and choke valves and the piston-cylinder suction control the volume and velocity of air and, therefore, control the air to fuel ratio in the air-fuel mixture. Accordingly, the engine power demands and throttle position vary the air-fuel mixture. In most engines the carburetor varies the ratio of air to fuel in the air-fuel mixture from 17:1 to 12:1 depending on the engine operating conditions.

Many carburetors are designed with one or more booster venturis to increase the pressure drop. Various other modifications are known which provide for the increase of fuel in the air-fuel mixture for particular engine operating conditions such as a cold engine, idle, low speed, start, and acceleration. Most of these modifications inject additional fuel into the mixture at or after the throttle valve.

Depending upon the number of cylinders in the engine and the performance desired, engines may be equipped with single, two, three or four barrel carburetors. Multiple barrel carburetors are essentially groupings of single barrel carburetors with the output of each barrel being separately conducted to different cylinders.

It has long been known that the vaporization of fuel in the air-fuel mixture is enhanced by heating. Heat has been provided to the air-fuel mixture by adding exhaust gas to the mixture between the carburetor and the intake manifold for the engine cylinders. Examples of such systems are disclosed in Hallett, U.S. Pat. No. 1,432,751; Kutscher, U.S. Pat. No. 1,099,504; Lovejoy, U.S. Pat. No. 1,201,977; Godfrey, U.S. Pat. No. 2,633,837 and Stille, U.S. Pat. No. 2,419,298.

More recently, efforts have been made to reduce exhaust gas pollution by recirculation of exhaust gas through the cylinders to burn uncombusted or partially combusted fuel entrained in the exhaust gas. This has been accomplished, as in Schultz, U.S. Pat. No. 3,872,845, for example, by injecting manually metered exhaust gas into the air-fuel mixture between the carburetor and the intake manifold during certain engine operating conditions. Bohls et al., U.S. Pat. No. 3,786,793, discloses an additional vacuum actuated valve system for the controlled introduction of additional air and exhaust gas into the air-fuel mixture between the carburetor and intake manifold during certain engine operating conditions. While the exhaust gas recirculation systems reduce pollution, they also have been shown to reduce fuel economy and engine efficiency.

The instant invention improves the performance and efficiency of internal combustion engines and reduces pollution by introducing exhaust gas into a lean air-fuel mixture in the carburetor in the area between the venturi and the throttle valve. The invention is a simple means of reducing pollution while greatly enhancing the efficiency of the engine. No complicated and expensive metering equipment is necessary; the introduction of the exhaust gas into the carburetor above the throttle valve into a air-fuel mixture provides improved atomization of fuel and is automatically metered to be commensurate with engine operating conditions by the carburetor throttle valve.

Road tests of vehicles having standard carburetors modified to incorporate the invention have demonstrated the advantages of the invention. In tests conducted on 1954 and 1962 Ford 5-ton trucks, a 1956 Thunderbird, 1967 Acadian Beaumont, 1958 Ford Custom, 1977 Mazda station wagon, and 1969 Dodge Dart, the invention provided, in most cases, a greater than 40% improvement in fuel economy, a significant reduction in exhaust gas pollution, an increase in engine power, longer life for spark plugs and oil due to less carbon contamination, a lower operating temperature, and continued efficient performance on lower octane fuel. These tests were conducted at various altitudes and over various periods of time.

The invention additionally provides a method for modifying existing engines to obtain the advantages.

SUMMARY OF THE INVENTION

The advantages of the invention will be set forth in part in the description which follows, and in part will be obvious from the description, or may be learned by practice of the invention. The advantages of the invention may be obtained by means of the instrumentalities and combinations particularly pointed out in the appended claims.

In accordance with the invention, as embodied and broadly described herein, a flow-type carburetor for an internal combustion engine having at least two cylinders and an exhaust system conducting exhaust gas from the cylinders, the carburetor including an air intake for receiving air, a venturi and a fuel nozzle cooperating to create an air-fuel mixture and conducting the air-fuel mixture through a throttle valve to the cylinders, is improved. The improvement comprises an exhaust conduit, means for conducting exhaust gas from the exhaust system to the carburetor, means in communication with the exhaust conduit, means for introducing exhaust gas into an area in the carburetor defined between the venturi and the throttle valve, and means for increasing the percentage of air in the air-fuel mixture in the area.

It is preferred that the exhaust gas introducing means constitute an exhaust gas port in the wall of the carburetor proximate the throttle valve directing the exhaust gas into the area at an angle to the axis of flow of the air-fuel mixture of between 75° and 105°.

Preferably the air increasing means comprises at least two ports in the wall of the carburetor directing air flow into the area toward the throttle valve at an angle to the axis of flow of the air-fuel mixture of between 30° and 60°, one air port being proximate the venturi and the other air port being proximate the throttle valve.

It is also preferred that conduit means be provided for conducting air from proximate the air intake to the air ports.

The accompanying drawings, which are incorporated in and constitute a part of this specification, illustrate embodiments of the invention and, together with the description, serve to explain the principles of the invention.

BRIEF DESCRIPTION OF THE DRAWINGS

FIG. 2 is a diagrammatical sectional view of a carburetor incorporating another embodiment of the invention and depicting its relation to the engine.

FIG. 3 is a sectional view of a carburetor incorporating another embodiment of the invention.

FIG. 4 is a sectional view of a carburetor incorporating still another embodiment of the invention.

FIG. 5 is a sectional view on line 5—5 of the embodiment of FIG. 4.

DESCRIPTION OF THE PREFERRED EMBODIMENTS

Figure 1:
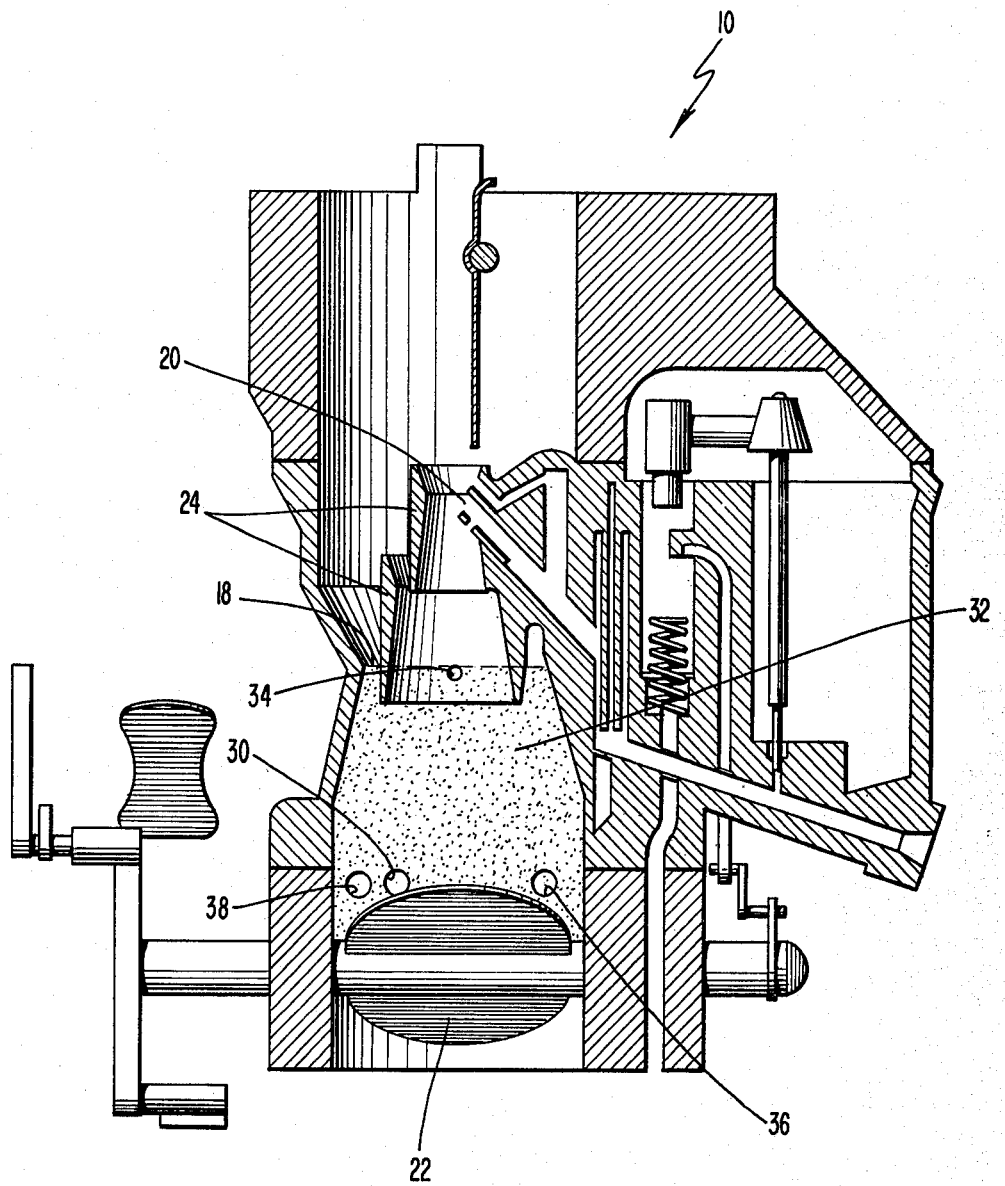
FIG. 1 is a sectional view of a carburetor incorporating one embodiment of the invention.

Reference will now be made in detail to the present preferred embodiments of the invention, examples of which are illustrated in the accompanying drawings.

Referring to FIGS. 1 and 2, it may be seen that flow-type carburetor 10 for an internal combustion engine having at least two cylinders 12 and exhaust system 14 for conducting exhaust gas from cylinders 12 includes air intake 16 for receiving air, venturi 18 and fuel nozzle 20 cooperating to create an air-fuel mixture conducted through throttle valve 22 to cylinders 12. As seen in FIG. 1, some carburetors include boost venturis 24, however, the present invention depends on the location of main venturi 18.

In accordance with the invention, the improvement to the flow-type carburetor comprises exhaust conduit means for conducting exhaust gas from the exhaust system to the carburetor. Preferably, as depicted in FIG. 2, the exhaust conduit means is a conduit 26 conducting exhaust gas from exhaust system 14 to carburetor 10.

It is preferred that the exhaust conduit 26 conduct exhaust gas from exhaust system 14 at a point 28 where exhaust gas from at least two cylinders 12 is present. Exhaust conduit 26 may draw exhaust gas from the exhaust manifold 29.

The volume of exhaust gas conducted to carburetor 10 is dependent on the exhaust gas pressure and the size of exhaust conduit 26. A relatively small amount of exhaust gas is conducted to carburetor 10 and is controlled by the size of exhaust conduit 26. For example, exhaust conduit 26 may be heat resistant pipe having an inside diameter of approximately 3/16 inch. The size of exhaust conduit 26 will vary, however, depending on the engine; but its length should be the minimum necessary to minimize heat and pressure loss.

The absence of any controls on the exhaust gas conducted to carburetor 10 permits the engine operating condition to determine the volume of exhaust gas conducted to carburetor 10. Exhaust gas pressure varies with engine operating condition. At a high power condition, the volume of air passing through the carburetor increases and the increased exhaust gas pressure provides a commensurate increase of exhaust gas to the carburetor. By allowing the engine operating condition to determine the amount of exhaust gas conducted to the carburetor, expensive and complicated metering and control equipment is avoided.

In accordance with the invention, the improvement further comprises means in fluid communication with the exhaust conduit means for introducing exhaust gas into an area in the carburetor defined between the venturi and the throttle valve.

Preferably, as seen in FIGS. 1 and 2, exhaust gas port 30 in the wall of carburetor 10 introduces exhaust gas into area 32 in carburetor 10 defined between venturi 18 and throttle valve 22. It may be preferred to introduce exhaust gas into area 32 defined between the narrowest point of venturi 18 and throttle valve 22.

As seen in FIG. 3, exhaust gas port 30 is in fluid communication with exhaust conduit 26. It is preferred that exhaust gas port 30 be disposed in the wall of carburetor 10 proximate throttle valve 22 at an angle of between 75° and 105° to the axis or path of flow of the air-fuel mixture from venturi 18 to throttle valve 22. Additionally, exhaust gas port 30 should be disposed so as not to be obstructed by throttle valve 22 in any position.

Introduction of exhaust gas into area 32 is regulated by the velocity of flow of the air-fuel mixture through throttle valve 22. Thus, the amount of exhaust gas introduced into the air-fuel mixture depends on the engine operating condition. The hot exhaust gas mixes with the air-fuel mixture to assist in vaporization of the fuel; too much heat from excessive exhaust gas may cause ignition in the carburetor. The amount of exhaust gas introduced in the carburetor is limited by the size of exhaust conduit 26 and of exhaust port 30 and is controlled within the limitation by exhaust gas pressure and throttle valve opening representing engine operating condition. This ensures introduction of the optimum amount of exhaust gas into the air-fuel mixture.

In accordance with the invention, the improvement further comprises means for increasing the percentage of air in the air-fuel mixture in the area. In the preferred embodiments depicted in FIGS. 1–4, the air increasing means comprises means for introducing air into area 32. It may be possible to increase the percentage in the air in the air-fuel mixture by adjustment of the cooperating venturis 18 and 24 and fuel nozzle 20.

For any particular engine operating condition, the ratio of air to fuel in area 32 should be greater than the current ratio of between 12:1 and 17:1. The leaner mixture in combination with the heated exhaust gas optimizes combustion providing the advantages of the invention.

As seen in FIGS. 1 and 2, the means for introducing air into area 32 is at least two air ports 34,36 in the wall of carburetor 10 directing air flow into area 32 toward throttle valve 22 at an angle to the path or axis of flow of air-fuel mixture of between 30° and 60°. One air port 34 is proximate venturi 18 and the other air port 36 is proximate throttle valve 22. It may be preferred to have air port 34 located at the narrowest point of venturi 18.

It also may be preferred to include a third air port 38 in the wall of carburetor 10 proximate throttle valve 22 and substantially opposite air port 36. The relative location of air ports 36, 38 may depend on the design of carburetor 10 and the available space on the wall; air ports 36, 38, however, should be separated by at least approximately 110° in substantially the same plane normal to the axis of air-fuel mixture flow. It is also preferred that exhaust gas port 30 be disposed substantially on the same plane of and between air ports 36, 38.

In the embodiment depicted in FIG. 1, air ports 34, 36, 38 are simply holes in the carburetor wall which draw air from the engine compartment. It should be understood that, where necessary due to engine and carburetor parameters, additional air holes may be disposed to communicate with area 32.

In the embodiments depicted in FIGS. 2-5, the improvement further includes conduit means in fluid communication with air ports 34, 36, 38 for conducting air from proximate the air intake 16 to air ports 34, 36, 38. Conducting air to air ports 34, 36, 38 from proximate air intake 16 permits use of filtered air which has passed through filter 40 rather than ambient air in the engine compartment.

As seen in FIG. 2, conduits 42, 44, 46 are disposed in the wall of carburetor 10 to conduct air from air filter 40 to air ports 34, 36, 38. In another embodiment, depicted in FIG. 3, tube 48 conducts air from proximate air intake horn 16 to air port 34.

In the embodiment depicted in FIGS. 4 and 5, an outside wall 50 surrounds and is spaced from the wall of carburetor 10 and defines passage 52 for conducting air from proximate air intake 16 to air ports 34, 38.

Although the description of the preferred embodiment has been directed to a single barrel carburetor, it is to be understood that the invention applies as well to multi-barrel carburetors. Each barrel would include each component of the improvement.

Also in accordance with the invention, a method is provided for improving the performance of an internal combustion engine having at least two cylinders, an exhaust system and a carburetor. The method comprises the steps of placing exhaust gas port 30 in the wall of carburetor 10 proximate throttle valve 22 at an angle to the axis of flow of air-fuel mixture of between 75° and 105° for providing fluid communication with area 32, conducting exhaust gas from exhaust system 14 to port 30, placing first air port 36 in the wall of carburetor 10 proximate throttle valve 22 and at an angle of between 30° and 60° to the axis of air-fuel mixture flow, and placing a second air port 34 in the wall of carburetor 10 proximate venturi 18 in a direction toward throttle valve 22 and at an angle of between 30° and 60° to the axis of air-fuel mixture flow.

In operation, air suctioned through air intake 16 by the downward or intake stroke of pistons in cylinders 12 and as limited by the position of throttle valve 22, passes through venturi 18 and boost venturis 24 drawing fuel from fuel nozzle 20 by means of the pressure difference created by the venturi of the air as it flows through venturi 18 and boost venturi 24 (if used). The air fuel mixture thus created is measured by the carburetor and is proportional to the opening of throttle valve 22 and the vacuum created in cylinders 12.

The air fuel mixture passes air port 34 which introduces additional air into the mixture. The additional air from air port 34 does not affect the amount of fuel extracted from fuel nozzle 20.

As the air fuel mixture approaches throttle valve 22 further additional air is introduced through air ports 36, 38 and exhaust gas is introduced through exhaust gas port 30 directly into the air fuel mixture flow. The exhaust gas provides additional heat optimizing atomization and vaporization of the air fuel mixture. The combination of the air-fuel mixture measured by the carburetor and the additional air and exhaust gas creates an ideal air-fuel mixture for compression and ignition in cylinders 12.

The invention provides an improved carburetor which greatly enhances the performance of internal combustion engines by increasing its fuel economy, increasing its power, and decreasing the pollution.

It will be apparent to those skilled in the art that various modifications and variations can be made in the improvements to the carburetor of the invention without departing from the scope or spirit of the invention.

What is claimed is:

1. In a flow-type carburetor for an internal combustion engine having at least two cylinders and an exhaust system conducting exhaust gas from said cylinders, said carburetor including an air intake for receiving air, a venturi and a fuel nozzle cooperating to create an air-fuel mixture and conducting said air-fuel mixture through a throttle valve to said cylinders, the improvement comprising:
   (a) an exhaust conduit conducting exhaust gas from said exhaust system to said carburetor;
   (b) an exhaust gas port in the wall of said carburetor proximate said throttle valve in fluid communication with said exhaust conduit for introducing said exhaust gas into an area in said carburetor defined between said venturi and said throttle valve, within the limitations imposed by the size of said exhaust gas conduit and port, the amount of exhaust gas introduced into said area being solely controlled by the difference between exhaust gas pressure within said exhaust system and fluid pressure in said area as determined by throttle valve position; and
   (c) air introducing means directly conducting air into said area for increasing the percentage of air in said air-fuel mixture in said area.

2. The carburetor as in claim 1 wherein said exhaust gas port directs flow of said exhaust gas into said area at an angle to the axis of flow of said air-fuel mixture of between 75° and 105°.

3. The carburetor as in claim 2 wherein the location of said exhaust gas port permits unobstructed flow of said exhaust gas through said port through all positions of said throttle valve.

4. The carburetor as in claim 1 wherein said air introducing means includes at least two air ports in the wall of said carburetor directing air flow into said area toward said throttle valve at an angle to the axis of flow of said air-fuel mixture of between 30° and 60°, one said air port being proximate said venturi and the other said air port being proximate said throttle valve.

5. The carburetor as in claim 4 also including air conduit means in fluid communication with said air ports for conducting air from proximate said air intake to said air ports.

6. The carburetor as in claim 4 also including a third air port in the wall of said carburetor proximate said throttle valve and substantially opposite said other air port, said exhaust gas port being between said air ports proximate said throttle valve.

7. The carburetor as in claim 1 wherein said air introducing means includes a plurality of air ports in the wall of said carburetor each directing air flow into said area toward said throttle valve at an angle to the axis of flow of said air-mixture of between 30° and 60°, one said air port being proximate said venturi and the remaining said air ports being substantially equally spaced in a plane, substantially normal to said axis of flow proximate said throttle valve.

8. The carburetor as in claim 1 wherein said exhaust conduit conducts exhaust gas from said exhaust system at a point where the exhaust gas from at least two cylinders are present.

9. The carburetor as in claim 4 wherein said area is defined between the narrowest point of said venturi and said throttle valve and wherein said one air port is disposed at the narrowest point of said venturi.

10. The carburetor as in claim 5 wherein said air conduit means are conduits in the wall of said carburetor.

11. The carburetor as in claim 5 wherein said air conduit means are tubes attached to the outside of the wall of said carburetor.

12. The carburetor as in claim 5 also including an outside wall surrounding and spaced from the wall of said carburetor and defining a passage for conducting air from proximate said air intake to said air ports.

13. A method for improving the performance of an internal combustion engine having at least two cylinders, an exhaust system conducting exhaust gas from said cylinders, and a carburetor, said carburetor including an air intake for receiving air, a venturi and a fuel nozzle cooperating to create an air-fuel mixture, and conducting said air-fuel mixture through a throttle valve to said cylinders, said method comprising the steps of:
 (a) placing an exhaust gas port in the wall of said carburetor proximate said throttle valve at an angle to the axis of flow of said air-fuel mixture of between 75° and 105° providing fluid communication with an area in said carburetor defined between said venturi and said throttle valve;
 (b) directly connecting an exhaust gas conduit between said exhaust system and said exhaust gas port such that, within the limitations imposed by the size of said exhaust gas conduit and port, the amount of exhaust gas introduced into said area is solely controlled by the difference between exhaust gas pressure within said exhaust system and fluid pressure in said area as determined by throttle valve position;
 (c) placing a first air port in the wall of said carburetor proximate said throttle valve in a direction toward said throttle valve and at an angle to the axis of flow of said air-fuel mixture of between 30° and 60°; and
 (d) placing a second air port in the wall of said carburetor proximate said venturi in a direction toward said throttle valve and at an angle to the axis of flow of said air-fuel mixture of between 30° and 60°.

14. The method of claim 13 further including the step of placing a third air port in the wall of said carburetor proximate said throttle valve and substantially opposite said first air port.

15. The method of claim 13 or 14 further including the step of attaching tubes to the outside surface of said carburetor wall for conducting air from proximate said air intake to said air ports.

16. The method of claim 13 or 14 further including the step of placing passages in the wall of said carburetor for conducting air from proximate said air intake to said air ports.

17. The method of claim 13 or 14 further including the step of placing an outside wall around and spaced from the wall of said carburetor defining a passage for conducting air from proximate said air intake to said air ports.

* * * * *